(12) United States Patent
Belokon et al.

(10) Patent No.: US 7,252,474 B2
(45) Date of Patent: Aug. 7, 2007

(54) SEALING ARRANGEMENT IN A COMPRESSOR

(75) Inventors: Alexander Belokon, Moscow (RU); Victor Osobov, deceased, late of Moscow (RU); by Valentina Osobova, legal representative, Moscow (RU); George L. Touchton, Newark, CA (US)

(73) Assignee: MES International, Inc., Asheville, NC (US)

( * ) Notice: Subject to any disclaimer, the term of this patent is extended or adjusted under 35 U.S.C. 154(b) by 283 days.

(21) Appl. No.: 10/661,850

(22) Filed: Sep. 12, 2003

(65) Prior Publication Data

US 2005/0058533 A1    Mar. 17, 2005

(51) Int. Cl.
*F01D 11/04*   (2006.01)
(52) U.S. Cl. .............. 415/1; 415/112; 415/168.2; 415/171.1; 415/173.5; 415/174.5
(58) Field of Classification Search ............ 415/1, 415/110–112, 171.1, 173.5, 174.5, 175–176, 415/58.2, 58.4, 168.2
See application file for complete search history.

(56) References Cited

U.S. PATENT DOCUMENTS

| | | | | |
|---|---|---|---|---|
| 1,998,784 | A * | 4/1935 | Mock | 415/169.2 |
| 3,650,634 | A | 3/1972 | Osborne et al. | |
| 3,927,889 | A | 12/1975 | Adams, Jr. et al. | |
| 4,196,910 | A * | 4/1980 | Aizu | 415/111 |
| 4,253,031 | A * | 2/1981 | Frister | 415/175 |
| 4,472,107 | A * | 9/1984 | Chang et al. | 415/104 |
| 4,754,607 | A * | 7/1988 | Mackay | 60/723 |
| 5,297,928 | A | 3/1994 | Imakiire et al. | |
| 5,816,784 | A * | 10/1998 | Postuchow et al. | 415/171.1 |
| 6,141,953 | A * | 11/2000 | Mongia et al. | 60/774 |
| 6,190,123 | B1 | 2/2001 | Wunderwald et al. | |

(Continued)

FOREIGN PATENT DOCUMENTS

EP   0 518 027 A1   12/1992

(Continued)

OTHER PUBLICATIONS

PCT International Search Report filed on Form PCT/ISA/210, International Application No. PCT/US2004/029430, International Filing Date Sep. 9, 2004, Applicant—MES International, Inc.

*Primary Examiner*—Edward K. Look
*Assistant Examiner*—Devin Hanan
(74) *Attorney, Agent, or Firm*—Alston & Bird LLP

(57) ABSTRACT

A sealing arrangement for a compressor that compresses a gaseous mixture of air and fuel includes a pressurized air supply duct for supplying pressurized air into a leakage pathway defined between a compressor wheel and a housing of the compressor, which leakage pathway leads from the main gas flow path into a bearing area of the compressor, the pressurized air being supplied at a pressure sufficient to ensure that air and gaseous fuel cannot flow from the main gas flow path through the leakage pathway into the bearing area. A portion of the pressurized air flows into the bearing area, while the remainder of the air flows outwardly and is either fed back into the main gas flow path or is combined with air and gaseous fuel that leaks past an outer seal and is recirculated back to the compressor inlet.

18 Claims, 5 Drawing Sheets

U.S. PATENT DOCUMENTS 6,192,668 B1 * 2/2001 Mackay ........................ 60/776
6,238,179 B1    5/2001 Wunderwald et al.
6,478,469 B1 * 11/2002 Jones ........................ 123/559.1

FOREIGN PATENT DOCUMENTS

| JP | 08 014056 | 1/1996 |
|---|---|---|
| SU | 848 914 A | 7/1981 |
| SU | 1 008 491 A | 3/1983 |

* cited by examiner

SEALING ARRANGEMENT IN A COMPRESSOR

FIELD OF THE INVENTION

The invention relates to air compressors, and particularly to sealing arrangements for such compressors.

BACKGROUND OF THE INVENTION

Catalytic combustors are beginning to be used in recuperated microturbine power generation systems. A microturbine power generation system derives mechanical power for driving the electrical generator from a small gas turbine engine generally known as a microturbine. The engine generally includes at least one turbine that receives the hot combustion gases from a combustor and expands the hot gases to rotate the turbine. The turbine drives at least one compressor wheel that rotates within a compressor housing and supports blades that compress the working fluid passing through. In a recuperated gas turbine engine in which the combustor is a catalytic combustor, typically a gaseous mixture of air and fuel is supplied to the compressor as the working fluid, or separate air and fuel flows are fed to the compressor and the air and fuel subsequently mix after compression. The compressor thus compresses the air and gaseous fuel, which is subsequently fed as an air-fuel mixture to the catalytic combustor, where the mixture is combusted. This arrangement allows for the elimination of a separate gas fuel compressor.

Unfortunately, compressing the fuel in the engine's compressor also gives rise to a likelihood of fuel leaking into the surrounding environment. In any compressor, once the working fluid is raised to a higher pressure, the fluid will seek to flow toward lower-pressure regions by any possible paths, which include leakage pathways that ultimately lead into the ambient air surrounding the engine. Such leakage pathways generally exist, for example, at interfaces between stationary and rotating parts of the compressor. For instance, in a radial compressor as commonly used in microturbines, a leakage pathway exists between the compressor wheel and the stationary compressor housing; this pathway leads into the bearing casing of the compressor. To reduce the amount of leakage into the bearing casing, it is common to include one or more seals between the rotating compressor wheel and the stationary housing. The seals have a high hydraulic resistance and hence discourage fluid from flowing past them into the bearing casing. Typically, the seals comprise labyrinth seals.

The amount of leakage from a compressor typically is relatively small, for example, less than one percent of the total mass flow through the compressor, and thus does not substantially impair the efficiency. Furthermore, the leakage effects are not all negative. For example, one positive effect of the leakage is to prevent oil migrating from the bearing casing into the main gas flow path of the compressor.

However, in the case where the working fluid of the compressor is air and gaseous fuel, even a very small amount of leakage will result in the release of unburned hydrocarbons into the surrounding environment. In a typical recuperated microturbine with a catalytic combustor burning natural gas (e.g., see U.S. Pat. Nos. 4,754,607 and 6,141,953), the air/fuel ratio is close to 100 to 1, meaning that the fuel concentration in the working fluid of the compressor would be close to 14,000 parts per million by volume (ppmvd). If only 0.5% leakage occurs through the compressor seals, then the unburned hydrocarbon emission from this source alone would be 70 ppmvd, which exceeds the acceptable regulatory limits for many areas. In some areas, such as the South Coast Air Quality Management District of the United States, and the Air Quality District for Tokyo and Yokohama, Japan, the maximum acceptable limit may be as low as 10 ppmvd.

Thus, there is a need for a compressor sealing arrangement that can ensure that virtually no fuel escapes into the surrounding environment.

BRIEF SUMMARY OF THE INVENTION

The present invention addresses the above needs and achieves other advantages, by providing a compressor sealing arrangement and method that utilize a supply of "clean" (i.e., containing no fuel) pressurized air from a suitable source to prevent fuel from flowing from the main gas flow path into the bearing area of the compressor.

In one aspect of the invention, there is provided a method for compressing air and gaseous fuel, comprising the steps of:

feeding air and gaseous fuel into a compressor having a compressor wheel that rotates within a main gas flow path of the compressor, the compressor wheel supporting a plurality of blades for compressing the air and gaseous fuel, the compressed air and gaseous fuel being discharged from the main gas flow path into a discharge duct; and supplying pressurized air into a leakage pathway defined between the rotating compressor wheel and a stationary member of the compressor, which leakage pathway leads from the main gas flow path into a bearing area of the compressor, the pressurized air being supplied at a pressure sufficient to ensure that air and gaseous fuel cannot flow from the main gas flow path through the leakage pathway into the bearing area.

In one embodiment of the invention, a compressor includes a sealing arrangement located in a portion of a leakage pathway defined between a surface of a rotating compressor wheel and a fixed wall of a compressor housing. The sealing arrangement comprises a hydraulic resistance element disposed in the leakage pathway between the surface of the compressor wheel and the fixed wall of the compressor housing, and a pressurized air supply duct leading through the compressor housing into the leakage pathway at a location between the hydraulic resistance element and a bearing casing of the compressor. The leakage pathway in this embodiment is free of any hydraulic resistance elements between the air supply duct and the bearing area. Clean pressurized air is supplied through the supply duct into the leakage pathway at a pressure higher than that in the main gas flow path. Accordingly, one portion of the pressurized air will flow into the bearing casing. The remainder of the air will flow past the hydraulic resistance element into the main gas flow path, thereby preventing air and gaseous fuel from flowing through the leakage pathway into the bearing casing. In this manner, the positive effects of air leakage into the bearing area are retained, while preventing fuel from leaking into the bearing area. In those cases where oil-lubricated bearings are employed, clean cool air will flow into the bearing area instead of hot compressor discharge air as in prior art sealing arrangements. This air will provide the same function of preventing oil from flowing into the leakage pathway behind the compressor wheel, but will not oxidize the oil, thereby eliminating one of the major causes of aging and deterioration. This will decrease oil consumption and increase the oil's useful life. For systems employing air bearings supplied with pressurized support air from an external source, air flowing from the bearings into the leakage pathway may minimize or eliminate the need for the separate clean air supply. In the case of magnetic bearings, the bearings may be designed so that cooling air flowing from the bearings after cooling them will flow into the leakage pathway and thereby reduce or eliminate the need for the separate air supply. Alternatively, the separate air supplied into the leakage pathway may be used to cool the magnetic bearings.

In another embodiment of the invention, the sealing arrangement comprises a hydraulic resistance element disposed between the surface of the compressor wheel and the fixed wall of the housing, a plurality of auxiliary blades mounted on the surface of the compressor wheel and spaced radially outwardly from the hydraulic resistance element such that a cavity is defined between the hydraulic resistance element and the auxiliary blades, and a pressurized air supply duct leading through the compressor housing into the cavity. In this embodiment, clean pressurized air is fed into the cavity of the sealing arrangement at a pressure less than that in the main gas flow path. A portion of this air will flow past the hydraulic resistance element into the bearing casing, as in the previously described embodiment. The remainder of the pressurized air will be further compressed by the auxiliary blades and pumped into the main gas flow path. The auxiliary blades prevent flow in the opposite direction, and thus prevent leakage of air and gaseous fuel into the bearing casing. This embodiment can be applied to oil-lubricated, air, or magnetic bearings.

In yet another embodiment, the sealing arrangement comprises first, second, and third hydraulic resistance elements disposed between the surface of the compressor wheel and the fixed wall of the compressor housing, the second hydraulic resistance element spaced radially outwardly of the first hydraulic resistance element such that a first cavity is defined therebetween, the third hydraulic resistance element spaced radially outwardly of the second hydraulic resistance element such that a second cavity is defined therebetween, a pressurized air supply duct leading through the compressor housing into the first cavity, and a recirculation duct leading from the second cavity back into compressor inlet for recirculating any air and gaseous fuel that leaks past the third hydraulic resistance element back to the compressor inlet. In this embodiment, the clean pressurized air can be supplied at a pressure lower than that in the main gas flow path. One portion flows into the bearing casing as in the prior embodiments. The rest of the air flows into the second cavity. Because the pressure in the second cavity is less than that in the main gas flow path, air and gaseous fuel will leak past the third hydraulic resistance element into the second cavity. The air and fuel in the second cavity are evacuated through the recirculation duct and are fed back into the compressor inlet.

In the various embodiments, the hydraulic resistance elements preferably comprise labyrinth seals, but the invention is not limited to any particular structure for achieving a high hydraulic resistance to discourage leakage.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
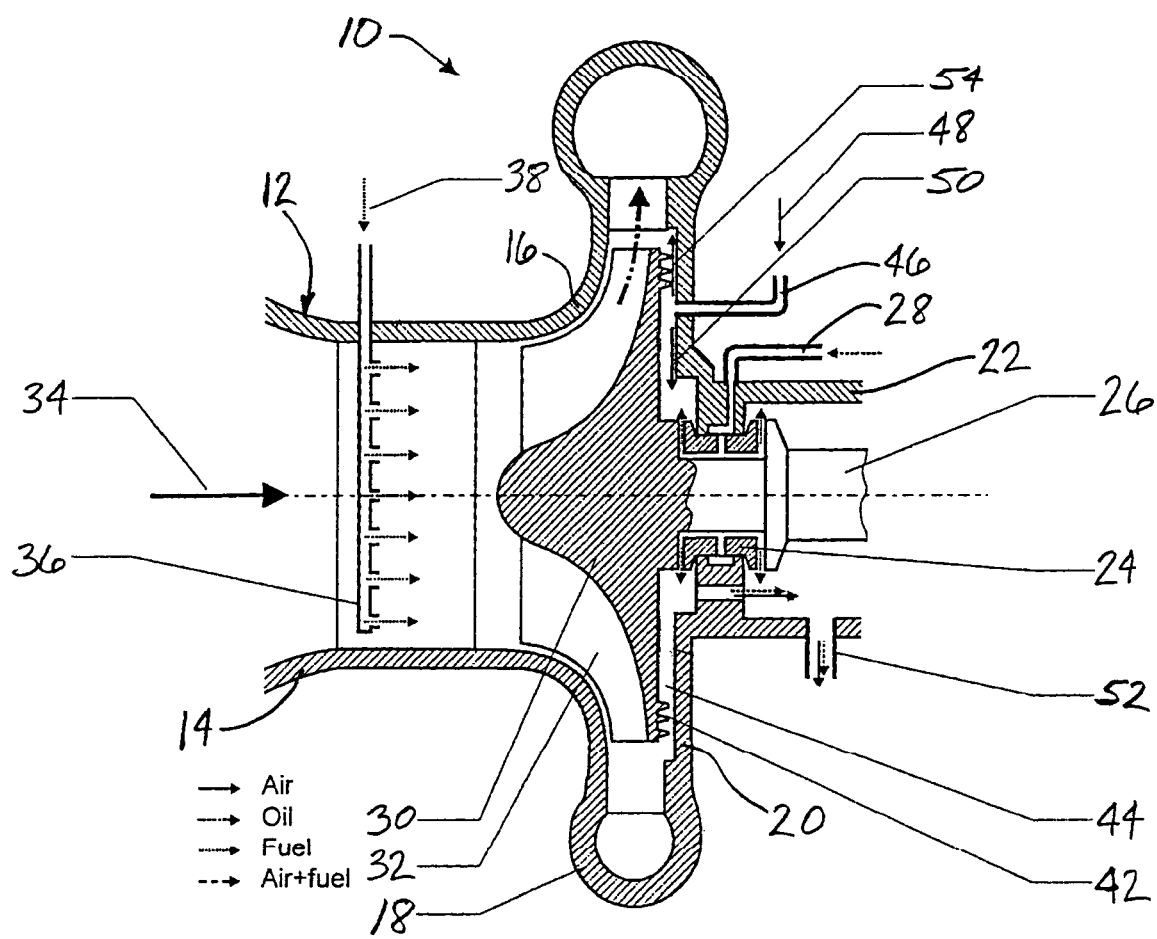
FIG. 1 is a schematic cross-sectional view of a compressor in accordance with a first embodiment of the invention.

FIG. 1 depicts a compressor 10 in accordance with a first embodiment of the invention. The compressor 10 includes a compressor housing 12 defining a generally tubular inlet duct 14 that extends generally axially. The housing 12 also defines an outer wall 16 that is joined to a downstream end of the inlet duct 14 and transitions from axially extending to generally radially extending; the outer wall 16 at its downstream end joins with a generally annular discharge duct 18 that surrounds the compressor. A rear end of the compressor housing includes a fixed wall 20 that extends radially inwardly from the discharge duct and lies opposite the wall 16. The radially inner end of the fixed wall 20 joins with a bearing casing 22 of the compressor.

The generally tubular bearing casing 22 houses at least one rotary bearing 24 for supporting a rotating shaft 26 that extends axially through the bearing casing. Lubricating oil is supplied to the bearing through at least one oil supply duct 28 that leads into the bearing casing.

The compressor includes a compressor wheel 30 formed generally as a disk. The wheel is mounted on a forward end of the shaft 26. A plurality of circumferentially spaced blades 32 are affixed to the wheel. Upon rotation of the wheel, the blades draw air through the inlet duct 14 (as indicated by arrow 34). The compressor also includes a fuel supply duct 36 that extends into the inlet duct 14 for supplying fuel (see arrow 38) into the air stream. Accordingly, an air-fuel mixture enters (or separate flows of air and fuel enter) the row of compressor blades 32 and is compressed by the blades and discharged into the discharge duct 18. Mixing of the fuel and air also takes place as the flow proceeds through the passages leading to and from the compressor blades. Alternatively, it is possible to introduce the fuel and the air into a mixer (not shown) located upstream of the compressor wheel so that the fuel and air are substantially mixed before entering the row of compressor blades.

The compressor includes a sealing arrangement between the rear-facing surface of the compressor wheel 30 and the fixed wall 20 of the compressor housing. The space between the wheel and the fixed wall represents a leakage pathway through which high-pressure air and gaseous fuel could leak into the bearing casing. At least part of the leaking pathway is defined between the rear surface of the compressor wheel 30 and the fixed wall 20 of the compressor housing. As previously noted, leakage of fuel into the bearing casing must be prevented. The sealing arrangement includes a hydraulic resistance element or seal 42 spaced radially outward of the bearing casing. Thus, a portion 44 of the leakage pathway is defined between the hydraulic resistance element 42 and the bearing casing. The portion 44 is free of any hydraulic resistance elements. The hydraulic resistance element 42 is shown as a labyrinth seal, although other types of seals for providing a high hydraulic resistance (e.g., brush seals) can be used instead. At least one pressurized air supply duct 46 extends through the compressor housing into the portion 44 of the leakage pathway.

In operation, pressurized air (as indicated by arrow 48) is supplied via the supply duct 46 into the pathway portion 44. The air is "clean", i.e., free of fuel. The pressurized air is supplied at a pressure exceeding that in the main gas flow path of the compressor (i.e., the pressure at the radially outward side of the outer seal 42). Accordingly, a portion 50 of the pressurized air will flow inwardly along the pathway portion 44 into the bearing casing. This air is evacuated from the bearing casing, along with oil that has already lubricated the bearing, through a drain duct 52. The air and oil can then be processed in an air-oil separator or the like, so that air that has been cleaned of oil vapors can be discharged to atmosphere, while the oil can be recovered. The remainder 54 of the pressurized air supplied to the pathway portion 44 will flow outwardly past the seal 42 into the main gas flow path of the compressor, and ultimately into the discharge duct 18. Thus, the sealing arrangement effectively eliminates virtually all possibility of fuel leakage into the bearing casing, such that substantially no fuel escapes from the compressor. The relative proportions of the air flows into the bearing area and out to the main gas flow path can be controlled by design procedures that are within the routine capability of those skilled in the art.

The pressurized air required for the sealing arrangement can be supplied from various sources (not shown). For example, a separate air compressor for providing the pressurized air can be mechanically driven by a power take-off arrangement coupled with the turbine engine itself, or driven by an electric motor. Alternatively, a dynamic compressor can utilize the energy in the compressor working fluid. The particular source of pressurized air for the sealing arrangement is not critical to the invention, and the invention is not limited to any particular type of source.

Figure 2:
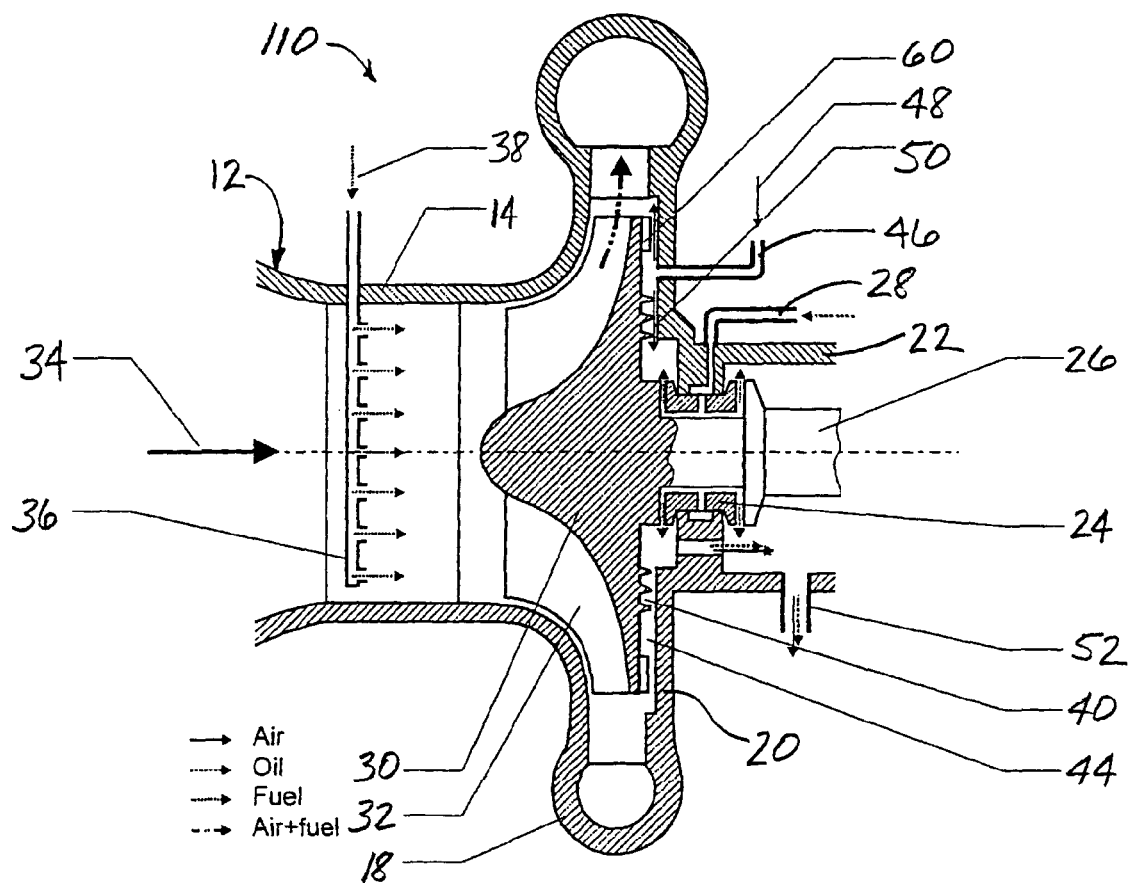
FIG. 2 is a schematic cross-sectional view of a compressor in accordance with a second embodiment of the invention.

A second embodiment of the invention is shown in FIG. 2. The compressor 110 of FIG. 2 is substantially similar to the compressor 10 of FIG. 1 (having a leakage pathway at least part of which is defined between the rear surface of the compressor wheel 30 and the fixed wall 20 of the compressor housing), except as noted below. The sealing arrangement of the compressor 110 includes a set of auxiliary blades 60 mounted on the rear surface of the compressor wheel 30, and may also include a hydraulic resistance element or seal 40 as shown. The auxiliary blades are spaced radially outward of the seal 40 such that a cavity or portion 44 of the leakage pathway is defined between the blades and the seal. A pressurized air supply duct 46 leads into the portion 44 of the leakage pathway. The auxiliary blades are configured to draw air radially outwardly through the blades and compress the air to a higher pressure. Accordingly, in this embodiment, the pressurized air 48 supplied through the supply duct 46 can be supplied at a pressure less than that in the main gas flow path of the compressor, but higher than the pressure in the bearing casing.

In operation, a portion 50 of the pressurized air supplied into the pathway portion 44 will flow radially inwardly, past the seal 40, if present, into the bearing casing. The remainder of the air will be drawn through the auxiliary blades 60 and raised to a pressure higher than that in the main gas flow path, so that the air will enter the main gas flow path and join with the main flow. The auxiliary blades thereby prevent air and gaseous fuel in the main gas flow path from migrating past the blades into the bearing casing. The seal 40 is useful but not essential, and can be omitted through proper design of flow passages in the bearing area and leakage pathway.

Figure 3:
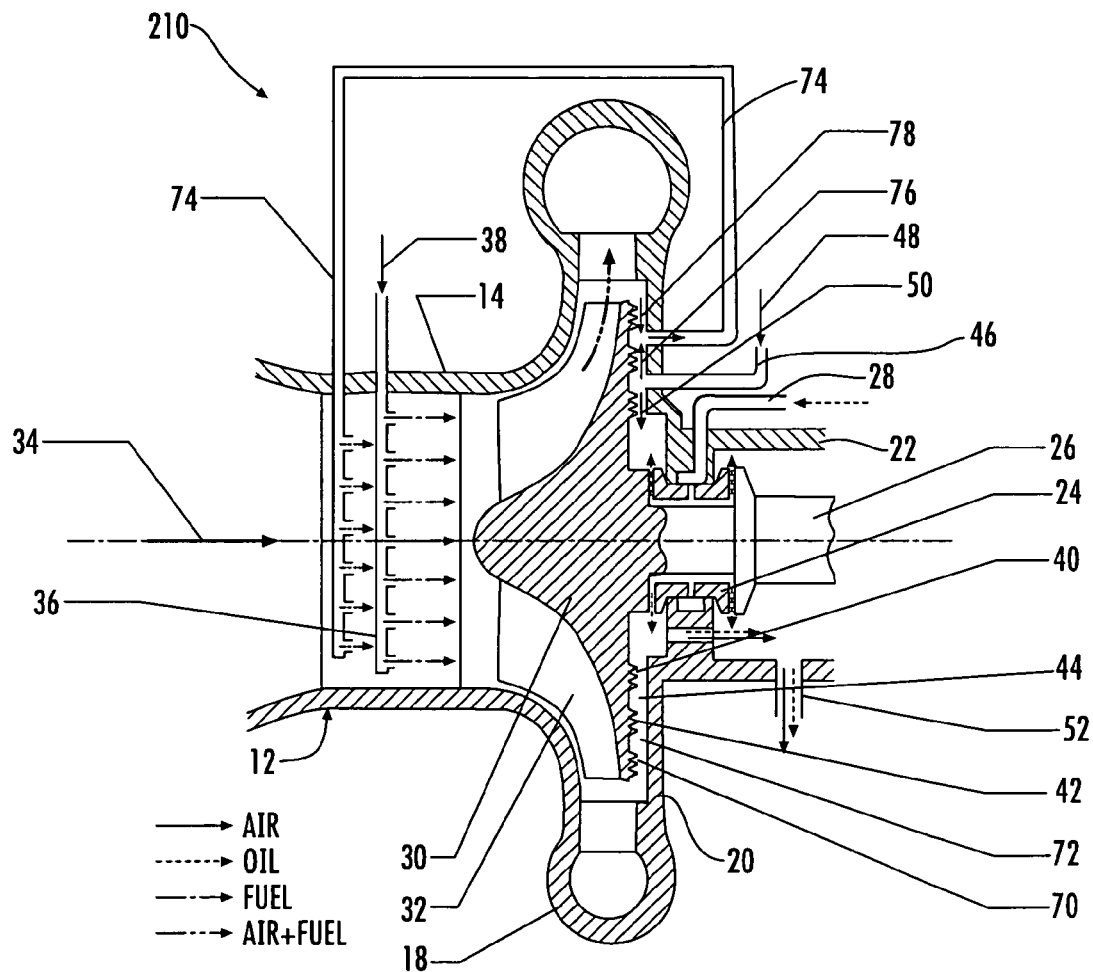
FIG. 3 is a schematic cross-sectional view of a compressor in accordance with a third embodiment of the invention.

A third embodiment of the invention is shown in FIG. 3. The compressor 210 of FIG. 3 is generally similar to the compressor 10 previously described, except as noted below. In this embodiment, the sealing arrangement of the compressor preferably employs three spaced seals. A first or inner seal 40 and a second seal 42 are arranged with a pathway portion or cavity 44 between them. A pressurized air supply duct 46 leads into this cavity 44 for supplying clean pressurized air 48 into the cavity. A third or outer seal 70 is spaced radially outwardly of the seal 42 such that a cavity 72 is defined between these seals. A recirculation duct 74 extends from the cavity 72 back to the compressor inlet duct 14. The first or inner seal 40 may be employed, but is not essential as previously noted.

In operation, clean pressurized air 48 is fed into the cavity 44 at a pressure higher than that in the bearing casing 22 but lower than that in the main gas flow path of the compressor. One portion 50 of the air will flow inwardly, past the inner seal 40 (if present), into the bearing casing. The remainder of the air 76 will flow outwardly past the middle seal 42 into the cavity 72. Since the pressure in the cavity 72 is lower than that in the main gas flow path, some air and gaseous fuel will flow from the main gas flow path inwardly past the outer seal 70 into the cavity 72, as indicated by arrow 78. The air and fuel in the cavity 72, however, is still at a higher pressure that than in the inlet duct 14, and hence this air and fuel will flow through the recirculation duct 74 back into the inlet duct 14. In this manner, fuel is prevented from leaking into the bearing casing.

In the various embodiments, the pressurized air that flows into the bearing casing preferably is cleaned of any oil vapors (e.g., in an air-oil separator, as well known to persons of ordinary skill in the art) before being vented to the atmosphere.

Figure 4:
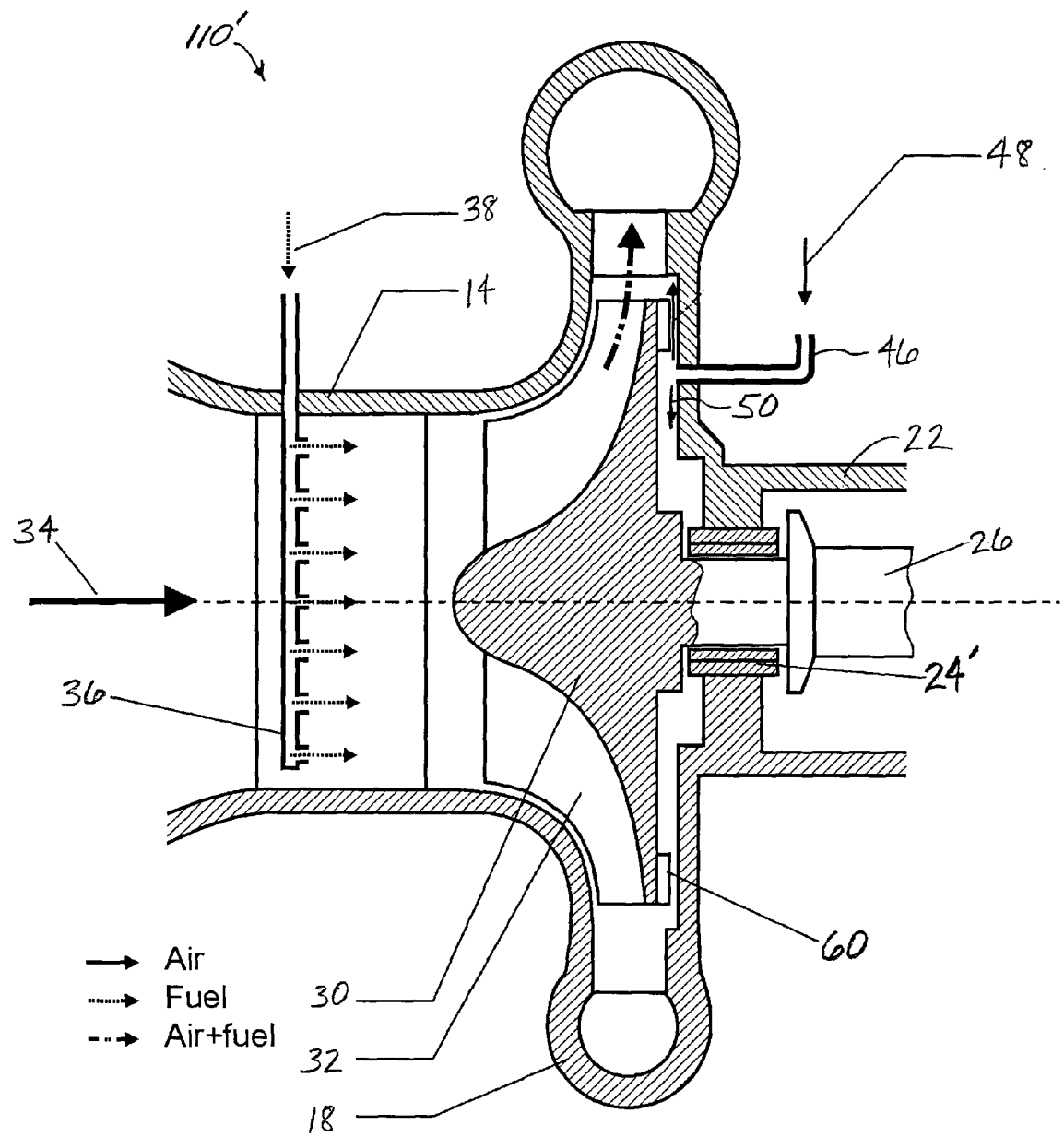
FIG. 4 is a schematic cross-sectional view of a compressor in accordance with a fourth embodiment of the invention.
Figure 5:
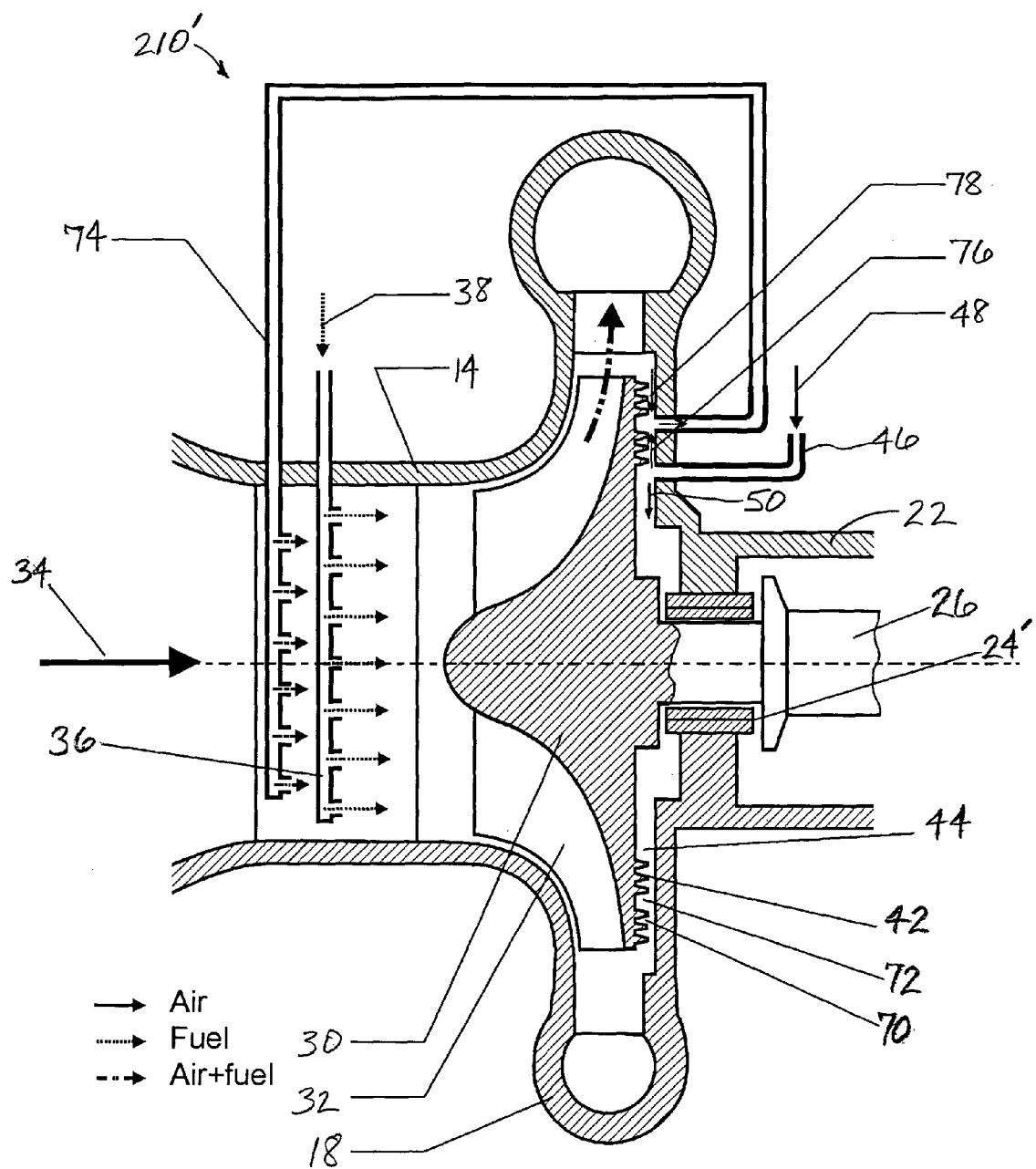
FIG. 5 is a schematic cross-sectional view of a compressor in accordance with a fifth embodiment of the invention.

As noted, the invention can also be applied to compressors having air or magnetic bearings. FIGS. 4 and 5 illustrate two such embodiments. FIG. 4 depicts a compressor 110' generally similar to that of FIG. 2, but having an air or magnetic (or combination air/magnetic) bearing 24' instead of an oil-lubricated bearing. Additionally, the hydraulic resistance element is omitted in this embodiment, although it may be included if desired. The sealing arrangement comprises a set of auxiliary blades 60 mounted on the rear surface of the compressor wheel 30. A portion 44 of the leakage pathway extends radially inwardly from the blades into the bearing casing 22; this pathway portion 44 is free of any hydraulic resistance elements. A pressurized air supply duct 46 leads into the portion 44 of the leakage pathway. The auxiliary blades are configured to draw air radially outwardly through the blades and compress the air to a higher pressure. Accordingly, in this embodiment, the pressurized air 48 supplied through the supply duct 46 can be supplied at a pressure less than that in the main gas flow path of the compressor, but higher than the pressure in the bearing casing. In operation, a portion 50 of the pressurized air supplied into the pathway portion 44 will flow radially inwardly into the bearing casing. The remainder of the air will be drawn through the auxiliary blades 60 and raised to a pressure higher than that in the main gas flow path, so that the air will enter the main gas flow path and join with the main flow. The auxiliary blades thereby prevent air and gaseous fuel in the main gas flow path from migrating past the blades into the bearing casing.

FIG. 5 shows a compressor 210' generally similar to that of FIG. 3 (having a leakage pathway at least part of which is defined between the rear surface of the compressor wheel 30 and the fixed wall 20 of the compressor housing), but having an air or magnetic (or combination air/magnetic) bearing 24' instead of an oil-lubricated bearing. The innermost hydraulic resistance element is omitted in this embodiment, although it may be included if desired. Thus, the sealing arrangement comprises hydraulic resistance elements or seals 42 and 70 that are radially spaced apart to define a cavity 72 between them. The leakage pathway portion 44 that extends radially inward from the inner seal 42 into the bearing casing is free of any further hydraulic resistance elements. The pressurized air supply duct 46 leads into this pathway portion 44. A recirculation duct 74 extends from the cavity 72 back to the compressor inlet duct 14. In operation, clean pressurized air 48 is fed into the pathway portion 44 at a pressure higher than that in the bearing casing 22 but lower than that in the main gas flow path of the compressor. One portion 50 of the air will flow inwardly along the pathway portion 44 into the bearing casing. The remainder of the air 76 will flow outwardly past the seal 42 into the cavity 72. Since the pressure in the cavity 72 is lower than that in the main gas flow path, some air and gaseous fuel will flow from the main gas flow path inwardly past the outer seal 70 into the cavity 72, as indicated by arrow 78. The air and fuel in the cavity 72, however, is still at a higher pressure that than in the inlet duct 14, and hence this air and fuel will flow through the recirculation duct 74 back into the inlet duct 14. In this manner, fuel is prevented from leaking into the bearing casing and therefore substantially no fuel escapes from the compressor.

In the case of air bearings, there are two basic types: aerodynamic, also known as dynamic or active bearings which are self-pressurized (including foil bearings), and aerostatic, also known as static bearings, which are externally pressurized. In accordance with the invention, air from either a dynamic or a static air bearing can flow into the leakage pathway of the compressor and thereby reduce or eliminate the need for a separate air supply for sealing purposes. Alternatively, for static bearings, the air supplied into the leakage pathway for sealing purposes can flow into the air bearing and thereby reduce or eliminate the need for a bearing air supply.

In the case of dynamic air bearings, in a conventional engine, when the engine is starting up, the load is taken up by the foils until the dynamic pressure from the rotation of the shaft takes over the load. This leads to deformation and wear of the foils, which can significantly limit the life of the bearing. In accordance with the invention, at low rotational speeds during shut-down or start-up, a portion of the sealing air supplied into the leakage pathway can be conducted into the bearing at a pressure and quantity sufficient to reduce or prevent wear on the foils. As the dynamic pressure in the bearing increases during start-up, the flow into the bearing from the leakage pathway will be progressively reduced; at high speed, the net flow in the leakage pathway could be either into the bearing or out of the bearing. During a planned or emergency shut-down, air flow from the leakage pathway would pressurize the air bearing.

The invention also achieves a number of advantages in the case of oil-lubricated bearings. The clean air leakage into the bearing casing prevents oil from migrating into the main gas flow path. The remainder of the clean pressurized air flows outwardly so as to prevent air and gaseous fuel from leaking into the bearing area. For all bearing types, the invention virtually eliminates any chance of fuel leaking into the bearing area and escaping into the environment via this route. The invention thereby enables a substantial reduction in emissions of unburned hydrocarbons, so that microturbine systems using air-fuel compressors potentially can be used in even the strictest air quality management districts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A compressor for compressing air and gaseous fuel, comprising:

a rotatable shaft;

a compressor wheel mounted on the shaft, the wheel having a plurality of blades affixed thereto;

a bearing casing defining an interior space;

a bearing mounted in the bearing casing and rotatably supporting the shaft;

a compressor housing surrounding the wheel, the compressor housing defining an inlet duct through which air is led into the compressor, and a main gas flow path, the compressor housing having a fixed wall immediately adjacent to and spaced from a surface of the compressor wheel, said surface extending from a location adjacent the main gas flow path generally radially inwardly toward the bearing casing;

a fuel supply duct arranged for supplying fuel into the inlet duct of the compressor, such that the compressor wheel compresses a mixture of air and fuel;

the compressor housing and bearing casing defining a leakage pathway from the main gas flow path of the compressor into the interior of the bearing casing, at least part of the leakage pathway being defined between the surface of the compressor wheel and the fixed wall of the compressor housing; and a sealing arrangement located in the leakage pathway, the sealing arrangement comprising a hydraulic resistance element disposed between the surface of the compressor wheel and the fixed wall of the compressor housing, and a pressurized air supply duct leading through the compressor housing into the leakage pathway at a location between the bearing casing and the hydraulic resistance element, and wherein the leakage pathway includes a portion that extends from the hydraulic resistance element to the bearing casing and that is free of any further hydraulic resistance elements;

wherein the sealing arrangement is structured and arranged to prevent fuel from leaking via the leakage pathway into the bearing casing and thereby escaping into the atmosphere, by virtue of the sealing arrangement including a source of pressurized air that is free of fuel and that has a pressure exceeding that in the main gas flow path, said source being arranged to feed the pressurized fuel-free air through the pressurized air supply duct into the leakage pathway such that the pressurized fuel-free air prevents fuel from flowing from the main gas flow path past the hydraulic resistance element and into the bearing casing.

2. The compressor of claim 1, wherein the hydraulic resistance element comprises a labyrinth seal.

3. The compressor of claim 1, further comprising an oil supply duct leading through the bearing casing into the interior thereof for supplying lubricating oil to the bearing, and an oil drain leading out from the interior of the bearing casing for evacuating air and oil from the bearing casing.

4. A compressor for compressing air and gaseous fuel, comprising:
   a rotatable shaft;
   a compressor wheel mounted on the shaft, the wheel having a plurality of blades affixed thereto;
   a bearing casing defining an interior space;
   a bearing mounted in the bearing casing and rotatably supporting the shaft;
   a compressor housing surrounding the wheel, the compressor housing defining an inlet duct through which air is led into the compressor, and a main gas flow path, the compressor housing having a fixed wall immediately adjacent to and spaced from a surface of the compressor wheel, said surface extending from a location adjacent the main gas flow path generally radially inwardly toward the bearing casing;
   a fuel supply duct arranged for supplying fuel into the inlet duct of the compressor, such that the compressor wheel compresses a mixture of air and fuel;
   the compressor housing and bearing casing defining a leakage pathway from the main gas flow path of the compressor into the interior of the bearing casing, a portion of the leakage pathway being defined between the surface of the compressor wheel and the fixed wall of the compressor housing; and
   a sealing arrangement located in said portion of the leakage pathway, the sealing arrangement comprising a hydraulic resistance element disposed between the surface of the compressor wheel and the fixed wall of the housing, a plurality of auxiliary blades mounted on the surface of the compressor wheel and spaced radially outwardly from the hydraulic resistance element such that a cavity is defined between the hydraulic resistance element and the auxiliary blades, and a pressurized air supply duct leading through the compressor housing into the cavity.

5. The compressor of claim 4, wherein the hydraulic resistance element comprises a labyrinth seal.

6. The compressor of claim 4, further comprising an oil supply duct leading through the bearing casing into the interior thereof for supplying lubricating oil to the bearing, and an oil drain leading out from the interior of the bearing casing for evacuating air and oil from the bearing casing.

7. A compressor for compressing air and gaseous fuel, comprising:
   a rotatable shaft;
   a compressor wheel mounted on the shaft, the wheel having a plurality of blades affixed thereto;
   a bearing casing defining an interior space;
   a bearing mounted in the bearing casing and rotatably supporting the shaft;
   a compressor housing surrounding the wheel, the compressor housing defining a main gas flow path, the compressor housing having a fixed wall immediately adjacent to and spaced from a surface of the compressor wheel, said surface extending from a location adjacent the main gas flow path generally radially inwardly toward the bearing casing;
   the compressor housing and bearing casing defining a leakage pathway from the main gas flow path of the compressor into the interior of the bearing casing, a portion of the leakage pathway being defined between the surface of the compressor wheel and the fixed wall of the compressor housing; and
   a sealing arrangement located in said portion of the leakage pathway, the sealing arrangement comprising first, second, and third hydraulic resistance elements disposed between the surface of the compressor wheel and the fixed wall of the compressor housing, the second hydraulic resistance element spaced radially outwardly of the first hydraulic resistance element such that a first cavity is defined therebetween, the third hydraulic resistance element spaced radially outwardly of the second hydraulic resistance element such that a second cavity is defined therebetween, a pressurized air supply duct leading through the compressor housing into the first cavity, and a recirculation duct leading from the second cavity back into the compressor inlet for recirculating back to the compressor inlet any air and gaseous fuel that leaks past the third hydraulic resistance element into the second cavity.

8. The compressor of claim 7, wherein the hydraulic resistance elements comprise labyrinth seals.

9. The compressor of claim 7, further comprising an oil supply duct leading through the bearing casing into the interior thereof for supplying lubricating oil to the bearing, and an oil drain leading out from the interior of the bearing casing for evacuating air and oil from the bearing casing.

10. The compressor of claim 7, further comprising a fuel supply duct leading into the compressor inlet for supplying fuel into the compressor.

11. A compressor for compressing air and gaseous fuel, comprising:
   a rotatable shaft;
   a compressor wheel mounted on the shaft, the wheel having a plurality of blades affixed thereto;
   a bearing casing defining an interior space;
   a bearing mounted in the bearing casing and rotatably supporting the shaft;
   a compressor housing surrounding the wheel, the compressor housing defining a main gas flow path, the compressor housing having a fixed wall immediately adjacent to and spaced from a surface of the compressor wheel, said surface extending from a location adjacent the main gas flow path generally radially inwardly toward the bearing casing;
   the compressor housing and bearing casing defining a leakage pathway from the main gas flow path of the compressor into the interior of the bearing casing, at least part of the leakage pathway being defined between the surface of the compressor wheel and the fixed wall of the compressor housing; and
   a sealing arrangement located in the leakage pathway, the sealing arrangement comprising a plurality of auxiliary blades mounted on the surface of the compressor wheel proximate the fixed wall of the compressor housing, the auxiliary blades being structured and arranged to draw air radially outwardly therethrough and raise the pressure of the air and inject the air into the main gas flow path of the compressor, the leakage pathway defining a portion that extends radially inwardly from the auxiliary blades into the bearing casing;

wherein the sealing arrangement is structured and arranged to prevent fuel from leaking via the leakage pathway into the bearing casing and thereby escaping into the atmosphere, by virtue of the sealing arrangement including a pressurized air supply duct leading through the compressor housing into said portion of the leakage pathway, and a source of pressurized air that is free of fuel and that has a pressure exceeding that in the main gas flow path, said source being arranged to feed the pressurized fuel-free air through the pressurized air supply duct into the leakage pathway such that the pressurized fuel-free air prevents fuel from flowing from the main gas flow path past the hydraulic resistance element and into the bearing casing.

12. A compressor for compressing air and gaseous fuel, comprising:
   a rotatable shaft;
   a compressor wheel mounted on the shaft, the wheel having a plurality of blades affixed thereto;
   a bearing casing defining an interior space;
   a bearing mounted in the bearing casing and rotatably supporting the shaft;
   a compressor housing surrounding the wheel, the compressor housing defining a main gas flow path, the compressor housing having a fixed wall immediately adjacent to and spaced from a surface of the compressor wheel, said surface extending from a location adjacent the main gas flow path generally radially inwardly toward the bearing casing;
   the compressor housing and bearing casing defining a leakage pathway from the main gas flow path of the compressor into the interior of the bearing casing, at least part of the leakage pathway being defined between the surface of the compressor wheel and the fixed wall of the compressor housing; and
   a sealing arrangement located in the leakage pathway, the sealing arrangement comprising first and second hydraulic resistance elements disposed between the surface of the compressor wheel and the fixed wall of the compressor housing, the second hydraulic resistance element spaced radially outwardly of the first hydraulic resistance element such that a cavity is defined therebetween, the leakage pathway having a portion that extends radially inwardly from the first hydraulic resistance element into the bearing casing, the sealing arrangement further comprising a pressurized air supply duct leading through the compressor housing into said portion of the leakage pathway, and a recirculation duct leading from the cavity back into the compressor inlet for recirculating back to the compressor inlet any air and gaseous fuel that leaks past the second hydraulic resistance element into the cavity.

13. A method for sealing a compressor used for compressing air and gaseous fuel such that substantially no fuel escapes from the compressor, wherein the compressor defines a leakage pathway that leads from a main gas flow path of the compressor generally radially inwardly into a bearing casing of the compressor, a portion of the leakage pathway being defined between a surface of a compressor wheel and a wall of a housing of the compressor, the method comprising the steps of:
   providing a hydraulic resistance element disposed between the surface of the compressor wheel and the wall of the compressor housing, and a plurality of auxiliary blades on the surface of the compressor wheel radially outwardly of the hydraulic resistance element such that a cavity is defined between the hydraulic resistance element and the auxiliary blades;
   supplying pressurized air that is free of fuel into the cavity at a pressure greater than that in the bearing casing but less than that in the main gas flow path such that a first portion of the pressurized air flows inwardly past the first hydraulic resistance element into the bearing casing; and
   drawing a second portion of the pressurized air through the auxiliary blades such that the auxiliary blades further pressurize the air and feed the air into the main gas flow path thereby preventing any air and gaseous fuel from leaking into the bearing casing.

14. A method for sealing a compressor used for compressing air and gaseous fuel such that substantially no fuel escapes from the compressor, wherein the compressor defines a leakage pathway that leads from a main gas flow path of the compressor generally radially inwardly into a bearing casing of the compressor, a portion of the leakage pathway being defined between a surface of a compressor wheel and a wall of a housing of the compressor, the method comprising the steps of:
   providing first, second, and third hydraulic resistance elements disposed between the surface of the compressor wheel and the wall of the compressor housing, the second hydraulic resistance element spaced radially outwardly of the first hydraulic resistance element such that a first cavity is defined therebetween, the third hydraulic resistance element spaced radially outwardly of the second hydraulic resistance element such that a second cavity is defined therebetween;
   supplying pressurized air that is free of fuel into the first cavity at a pressure greater than that in the bearing casing but less than that in the main gas flow path such that a first portion of the pressurized air flows inwardly past the first hydraulic resistance element into the bearing casing, while a second portion of the pressurized air flows outwardly past the second hydraulic resistance element into the second cavity, a portion of air and gaseous fuel also leaking from the main gas flow path past the third hydraulic resistance element into the second cavity; and
   recirculating the air and fuel from the second cavity back to an inlet of the compressor, thereby preventing any air and gaseous fuel from leaking into the bearing casing.

15. A method for compressing air and gaseous fuel, comprising the steps of:
   feeding air and fuel into a compressor having a compressor wheel that rotates within a main gas flow path of the compressor, the compressor wheel supporting a plurality of blades for compressing the air and fuel; and
   supplying pressurized air into a leakage pathway defined between the compressor wheel and a housing of the compressor, which leakage pathway leads from the main gas flow path into a bearing area of the compressor, the pressurized air being supplied at a pressure sufficient to ensure that the air and fuel cannot flow from the main gas flow path through the leakage pathway into the bearing area;
   wherein the compressor includes an air bearing that employs pressurized air, a portion of the pressurized air for the air bearing flowing out into the leakage pathway so as to prevent flow of fuel into the bearing area.

16. The method of claim 15, wherein the compressor includes a static air bearing that employs pressurized air, and wherein pressurized air from an external source is supplied into the leakage pathway and a portion of said pressurized air flows into the air bearing and thereby reduces or eliminates a need for a separate air bearing air supply.

17. The method of claim 15, wherein the compressor includes a magnetic bearing, and during compressor start-up a portion of the pressurized air supplied into the leakage pathway flows into the magnetic bearing to protect the bearing.

18. The method of claim 15, wherein the compressor includes a magnetic bearing, and during compressor shutdown a portion of the pressurized air supplied into the leakage pathway flows into the magnetic bearing to protect the bearing.

* * * * *